Dec. 30, 1969  T. A. CARTER  3,487,241

LINEAR MOTOR-GENERATOR

Filed Nov. 7, 1967

INVENTOR.
THOMAS A. CARTER
BY
Hyman Jackman
ATTORNEY

United States Patent Office

3,487,241
Patented Dec. 30, 1969

3,487,241
LINEAR MOTOR-GENERATOR
Thomas A. Carter, North Hollywood, Cailf., assignor of thirty percent to Robert S. Swope, Northridge, Calif., and five percent to Richard E. Eriksen, Canoga Park, Calif.
Filed Nov. 7, 1967, Ser. No. 681,237
Int. Cl. H02k *41/00*
U.S. Cl. 310—13                                    4 Claims

ABSTRACT OF THE DISCLOSURE

A linear motor-generator having a magnetic-transfer housing in which a magnet that mounts a pole piece is provided, a bearing pin extending axially from said pole piece and comprising a guide on which a magnetic coil assembly is slidingly mounted, the coil of said assembly operatively extending into a clearance hole constituting a flux cavity in the other pole piece of the housing.

---

This invention relates to linear motors and current generators.

Magnetic machines of the type referred to have, in the past, been designed for characteristics common to early uses or requirements of linear motion. It was common for such early designs to be characterized by dynamically unbalanced working-mass movements that affected, especially restricted, the optimum or overall capability of operating movement. Due to such mass inbalance, operational time of current movements was not in a range compatible with present-day requirements for high-speed rise time and straight in-balance linear power to operate a stylus to graphically mark or write with pressure, ink, electricity, heat, or other energy.

One trend in the design of presently available linear motors is to use the coil as a bearing against the inner pole of the magnetic flow of the galvanic movement. Such an arrangement entails a design restriction as to the ratio of coil diameter and length, and dictates a design resulting in a magnetic path of particular characteristics. For example, a magnetic circuit is required for a high-power, high-frequency response, as is a low-mass coil movement; as the diameter of the inner magnetic pole piece is increased, the length of the working coil length would require to be increased to maintain a proper diameter to length of bushing bearing ratio.

Recognizing the above enumerated faults in prior linear motor-generator design, it is an object of the present invention to provide a linear motor-generator having dynamically balanced movement, thereby being sensitive in operation and capable of high-power, high-frequency, low-mass movement, and efficient diameter to length ratio bearing.

Another object of the invention is to provide such a motor-generator that is simple of fabrication, and of low cost to manufacture, since the dynamic balance feature of the device enables broad-tolerance design.

A further object of the invention is to provide a linear motor-generator that enables flexibility of change of coil movements, thereby enabling the specifications of the moving coil to be changed to provide adjustability of mass-power ratio.

A still further object of the invention is to provide a construction that provides for facile adjustability of coil travel to meet specifications.

A yet further object of the invention is to provide a motor-generator that is really and conveniently adapted to a linear transmission and for mechanical extension excursion of the coil movement.

A yet further object of the invention is to provide a device, as characterized, that is adapted for facile installation and ease and simplicity of arrangement, not being limited in this regard to matching holes, screws and bolts.

A yet further object of the invention is to provide such a motor-generator in which the moving coil and its mount are so enclosed as to protect the same from foreign matter and dust particles as well as from damage.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

Figure 1:
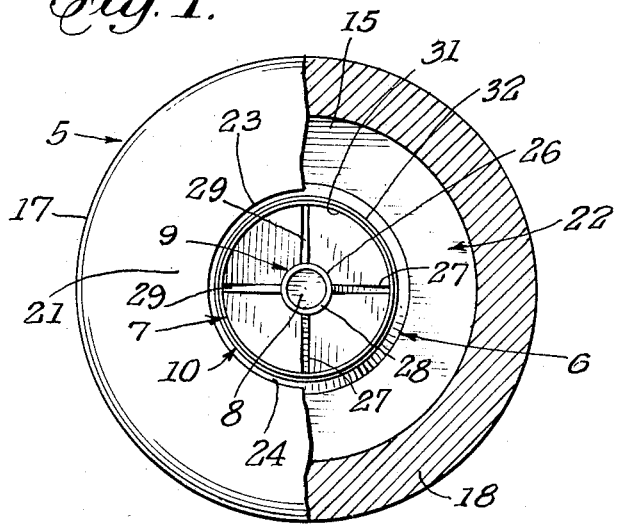
FIG. 1 is an end view, partly in elevation and partly in section, of a linear motor-generator according to the present invention.
Figure 2:
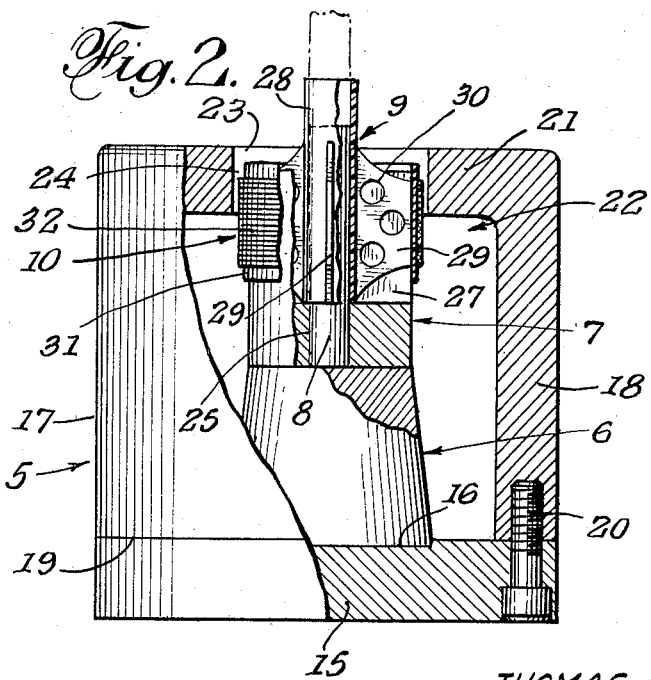
FIG. 2 is a side elevational view, partly in longitudinal section.

The linear motor-generator that is illustrated comprises, generally, a magnetic-transfer housing 5, a magnet 6 fixedly mounted within said housing, a pole piece 7 mounted on and extending from the end of said magnet, a bearing 8 affixed in and extending axially from the pole piece 7, a member 9 having longitudinal sliding bearing on said bearing 8, and a magnetic coil 10 around said pole piece 7 and affixed to said member 9.

The magnetic-transfer housing 5, of magnetizable metal, is shown as comprising a base plate 15 having a central shallow seat 16, and a cup-like member 17 having a cylindrical wall 18 with its end edge 19 engaged with the marginal edge portion of plate 15 and secured thereto as by cap screws 20, and an end wall 21 that constitutes a pole piece which is of opposite polarity to that of the plate 15. Said housing 5 has an interior space 22, and the pole piece wall 21 has a preferably cylindrical opening 23 that is axially aligned with the seat 10.

The magnet 6 may be cylindrical but is here shown as slightly tapered. Its larger end is disposed in the seat 16 and is affixed to the plate 15, as by epoxy resin or other suitable adhesive or connecting means. The smaller end of the magnet 6 extends toward the opening 23 and is coaxial therewith. Said magnet end is preferably transversely flat, as shown.

The pole piece 7 is shown as a cylindrical member of a diametral size approximating that of the smaller end of the magnet 6, and is affixed to said end, also by epoxy resin or other suitable connecting means. The other end of the pole piece extends into the opening 23 with considerable clearance, forming flux field 24. It will be clear that the elements 15, 17, 6 and 7 form a permanent magnet in which the end wall 21 is a pole of one polarity and the end of the pole piece 7 is a pole of the opposite polarity, said clearance 24 constituting a magnetic flux cavity.

Said pole piece 7. at its end adjacent the magnet 6, has an axial bore 25 which extends to the end of the pole piece as a counterbore 26. For the longitudinal extent of said counterbore, the pole piece 7 is provided with a number of longitudinal slits 27. Four such slits are shown, but their number may vary according to the design of the member 9, as will be seen hereinafter.

The bearing 8 is shown as a pin that is tightly fitted in the bore 25 and preferably extends through the counterbore 26 to the end of the pole piece 7 or therebeyond, as shown. It will be clear that an annular space is formed between the bearing pin and the face or wall of the counterbore 26, and that the mentioned slits 27 are open to said annular space. Said bearing pin 8 is shown, merely, as an example of a low-friction mount for the member 9. Depending on the room available, anti-friction balls, rollers or discs may be incorporated in the bearing 8 to minimize friction between it and the member 9.

The member 9 is shown as a thin-walled dielectric tube 28 that has a loose, slip fit in the annular space between the counterbore 26 and the bearing 8, and a number of dielectric vanes 29 extending radially from said tube and having a loose, slip fit in the slits 27. Said tube and vanes may be made of nonmagnetic metal, but phenolic resin is preferred therefor, due to its lightness and minimum lag resistance to longitudinal movement of said member on the pole piece 7. Lightening holes may be formed in the vanes 29, as at 30, to further reduce the weight of the member 9. The outer edges of said vanes 29 extend a small distance, several thousandths of an inch, beyond the outer cylindrical face of the pole piece 7.

The magnetic coil 10 is shown as comprising a tubular core 31 that is cemented or affixed by epoxy resin to the mentioned end of the vanes 29. The inner diameter of said core 31 has suitable, but small, clearance around the pole piece 7. The coil windings 32 on said tube reside in the magnetic flux cavity 24.

The tube 28 is preferably extended so as to be adapted to receive and hold a pen stylus or other marking instrument 33 for marking on a surface during operation of the device as a linear motor. The elongated bearing length of the tube 28 on the bearing 8 in ratio to the small diameter of said parts, provides for the desired dynamic balance of the forces generated in the coil 10 and transmitted to the graphic writing resistance of the stylus 33. A one-to-five bearing ratio between the bearing 8 and the tube 28 provides the desired balance and stability above mentioned. The clearances between the bearing 8 and the member 9, at the center, and between the coil 10 and the pole piece 21, may be kept small, minimizing bending moments and substantially reducing unequal friction that may affect coil movement. Also, the ease of interchange of coils 10 is deemed to be evident. The same may be slid to and from operative position from above.

The permanent magnet, above described, has opposite polarity at the two pole pieces 7 and 21. Thus, the coil 10, in the manner of a solenoid coil, cuts across the flux field 24. The coil 10 may be wound, for instance, as an electronic calculator or computer. The same, when excited by current conduction of various inputs or outputs by leads connected thereto, moves in one direction or the other relative to a centered or zero position in the flux field 24. The movement is longitudinal to infinity according to the force of electrical excitement or mechanical displacement imposed on said coil.

Having thus described this invention, what is claimed and desired to be secured by Letters Patent is:

1. A linear motor-generator comprising:
   (a) a permanent magnet having one pole provided with an opening therein, and a second pole extending axially into and spaced from the wall of the opening,
   (b) the portion of the second pole that is disposed in said opening and the adjacent portion thereof, being provided with an axial bore and with longitudinal slot means extending radially between said bore and the outside face of the second bore,
   (c) a coil around said second pole and extending into and clear of the wall in the opening in said one pole,
   (d) an annular magnetic flux cavity being defined in said opening between the coil and the hole wall,
   (e) an axial bearing pin affixed to the second pole and slidingly mounting said coil for longitudinal movement across the annular flux cavity,
   (f) a stylus-mounting tube slidingly mounted on the bearing pin, and
   (g) substantially radial vane means extending through the slot means and fixedly connecting the stylus-mounting tube and the coil whereby the latter has longitudinal movement across the annular flux cavity.

2. A linear motor-generator according to claim 1 in which the diameter-length bearing ratio of the tube is approximately one-to-five.

3. A linear motor-generator according to claim 1 in which the permanent magnet constitutes a magnetic transfer housing in which one end mounts the second pole, the opposite end comprises the pole having the opening defining the mentioned flux cavity, and a cylindrical wall connects said housing ends.

4. A linear motor-generator according to claim 3 in which the stylus-mounting tube extends beyond the pole having the opening, said tube having an end to receive and hold a stylus in coaxial position with the common axis of said bearing tube, coil and hole.

References Cited

UNITED STATES PATENTS

| | | | |
|---|---|---|---|
| 3,149,254 | 9/1964 | Carter | 310—15 XR |
| 2,591,795 | 4/1952 | Eisler | 177—352 |
| 2,835,832 | 5/1958 | Efromson | 179—115.5 XR |
| 2,832,903 | 4/1958 | Carter | 310—27 |
| 3,085,847 | 4/1953 | Massa | 179—115.5 XR |
| 2,367,026 | 1/1945 | Hutter | 179—115.5 |
| 2,118,862 | 5/1938 | Raymond et al. | 310—27 |

MILTON O. HIRSHFIELD, Primary Examiner

B. A. REYNOLDS, Assistant Examiner

U.S. Cl. X.R.
179—115; 310—27